United States Patent [19]

Beaverstock et al.

[11] Patent Number: 5,134,574
[45] Date of Patent: Jul. 28, 1992

[54] PERFORMANCE CONTROL APPARATUS AND METHOD IN A PROCESSING PLANT

[75] Inventors: Malcolm C. Beaverstock, Foxboro; Peter G. Martin, Carver, both of Mass.

[73] Assignee: The Foxboro Company, Foxboro, Mass.

[21] Appl. No.: 485,698

[22] Filed: Feb. 27, 1990

[51] Int. Cl.$^5$ .............................................. G06F 15/20
[52] U.S. Cl. .............................. 364/551.01; 364/131; 364/552
[58] Field of Search .............. 364/131, 551.01, 551.02, 364/552

[56] References Cited

U.S. PATENT DOCUMENTS

| | | | |
|---|---|---|---|
| 3,234,532 | 2/1966 | Rogers | 364/551.01 X |
| 4,145,744 | 3/1979 | Sidorovich et al. | 364/551.02 X |
| 4,346,446 | 8/1982 | Erbstein et al. | 364/551.01 |
| 4,517,637 | 5/1985 | Cassell | 364/551.01 X |
| 4,947,349 | 8/1990 | Munenaga et al. | 364/551.01 |
| 4,953,097 | 8/1990 | Crain et al. | 364/131 X |
| 5,008,842 | 4/1991 | Nagai et al. | 364/551.01 X |

*Primary Examiner*—Parshotam S. Lall
*Assistant Examiner*—Edward R. Cosimano
*Attorney, Agent, or Firm*—Hamilton, Brook, Smith & Reynolds

[57] ABSTRACT

Processing plant control apparatus provides real-time indications of performance of plant operations with respect to curent state of process means. The real-time indications enable operations personnel to timely adjust process means to improve current performance of plant operations. Sensors coupled to the process means provide data input to the computer means of control apparatus. The computer means performs programmed computations on the input data to provide quantitative information of current performance of plant operations. The control apparatus provides the computer information in a graphical form displayed on video displays. Video displays of the computed information over time are also provided. The control apparatus also stores the computed information in a relational database which enables access to the information for other applications.

18 Claims, 6 Drawing Sheets

PERFORMANCE CONTROL APPARATUS AND METHOD IN A PROCESSING PLANT

BACKGROUND OF THE INVENTION

In a process plant, various processes are employed to produce amounts of a desired product. To measure general performance of manufacturing operations of a product, it has been traditional to count the amount of product produced over a certain period of time of operation and from that amount calculate a cost per unit product made. The cost per unit product made is based on a standard costs function for the operation, typically developed at the beginning of a fiscal time period and used throughout that period. The ratio (cost per unit product made) is used in periodic reports to manufacturing management to evaluate manufacturing performance and over the years has generally served as the primary measure of manufacturing performance.

One disadvantage to this approach to measuring manufacturing performance is that *all* plant costs are allocated to each product or product line in the determination of cost per unit product. However, most of the costs in a manufacturing plant are not directly assignable to a product or product line and therefore must be allocated based on other factors. The factors usually have more to do with the perceived performance of the manufacturing operation than the actually occurring manufacturing practices.

A second disadvantage is a considerable percentage of the costs in a manufacturing plant that are used to calculate the cost per unit product made is totally out of the scope of manufacturing's authority. Thus, the performance measurement of cost per unit product made has led to a pure "volume base" manufacturing approach, which may not be the best approach to meet market and corporate requirements.

Another disadvantage is that the calculation to determine cost per unit product made is based on the amount of each product or product line that is produced and is not sensitive to any specific problems incurred in the production of a specific product. For example, if a bad batch of a given product is produced and thrown away, the standard allocation algorithm has no way of assigning the costs associated with that batch to the specific product. Instead these costs are allocated to all products made.

Other approaches to measuring manufacturing performance involve non-cost/non-financial measurements and include measurements of quality, delivery integrity and customer satisfaction. These approaches have been directed primarily to the discrete manufacturing industry and still involve collecting information and displaying results in the traditional daily, weekly or monthly report format. Hence, such approaches do not timely provide measurements such that operations personnel can improve on the process on which the measurements were made.

SUMMARY OF THE INVENTION

The present invention recognizes that the cost per unit product made ratios produced by a traditional performance measurement system are inaccurate and unrepresentative of the manufacturing operations. Further, the present invention recognizes that traditional manufacturing performance measurements are not provided in a sufficiently timely manner to allow operations personnel to improve their performance. That is, the present invention recognizes that if manufacturing people receive their measure of performance long after the completion of the production on which they were measured, they will not be able to efficiently apply the performance measurement and effect improvement of manufacturing performance.

To that end, the present invention provides a real-time (dynamic), sensor-based performance control apparatus. The control apparatus operates within a manufacturing or process plant having a plurality of process means for providing various processes to form an output product. The process means are operated in a pattern to provide manufacturing operations. The control apparatus employs a multiplicity of sensors coupled to the process means and computer processing means for providing from sensor signals a real-time indication of current performance of manufacturing operations. Performance is indicated in terms of quality of generated products, cost of production, down time, yield, and/or production.

Specifically, each sensor provides signals indicative of current state of a respective process means. A digital processor assembly is coupled to the sensors to receive the sensor signals. Supported by the digital processor are computer means which determine from the sensor signals a quantitative measurement of current performance of the manufacturing operations based on current operation of at least one process means. For example, the computer means calculates production cost as a function of sensed current amounts of resources used, and calculates quantity of production as a function of sensed rate of operation of certain process means.

The computer means further provides screen views displayed on a video display coupled to the digital processor assembly. The screen views display indications of the determined measurement of current performance of manufacturing operations with respect to a predetermined target performance measurement. Subsequent operator adjustment through control means coupled to the process means in accordance with the indications in the screen views causes states of the process means to approach operation which provides the predetermined target performance of the manufacturing operations.

Along with screen view displays, the computer means provides sounding of alarms in accordance with determined performance measurements. The alarms are coupled to the digital processor assembly. In particular, the computer means sounds an alarm when certain thresholds are crossed by process means and/or by determined performance. For example, the computer means enables an alarm when determined performance measurement based on current cost of production exceeds a predefined threshold, and/or when determined perfomance measurement based on quality falls outside a predefined range.

In accordance with one aspect of the present invention, the plurality of process means includes pumps, storage vessels, transfer lines, valves and the like found in a processing plant. Also, the multiplicity of sensors includes temperature sensors, volume sensors, weight sensors, pressure sensors and the like.

In a preferred embodiment of the present invention, the digital processor assembly includes a plurality of processor modules. Different sensors are coupled to different processor modules. Each processor module has an object manager which transmits respective sensor signals to the computer means upon request by the computer means. Preferably, each sensor signal is formed of a named series of data points stored in a memory area, and each object manager enables access of data points by name instead of memory location.

Further the computer means may be coupled to an external system for receiving therefrom pertinent predefined measurements of target performance.

In accordance with another aspect of the present invention, the control means may be coupled to the digital processor assembly.

In addition, a processor member supported by the digital processor assembly receives from the computer means various working data and stores the working data on a common time line in a global data base for general access. The working data includes determined performance measurements, predetermined target measurements, indications of sensed states of process means, operator adjustments and predefined thresholds for alarms. In a preferred embodiment, the database is a relational database accessable globally at subsequent times as desired for different applications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts in throughout the different views. The drawings are not necessarily to scale, emphasis instead being placed upon illustrating the principles of the invention.

DETAILED DESCRIPTION OF THE PREFERRED EMBODIMENT

A manufacturing or process plant employs various and numerous equipment to provide different functions or effects on source materials to form desired finished products. The different pieces of equipment or groups thereof are generally referred to herein as process means. And the functions provided by the different pieces of equipment or groups thereof are generally referred to herein as processes.

Generally the present invention employs (i) real-time sensing (i.e. sensing during processing) of the current state of the processes and the process means which are involved in the processing of subject materials, and (ii) computer processing of the real-time data. Specifically, through computer executed calculations, the present invention determines from the real-time sensor based data, quantitative measurements of performance of current manufacturing operations. Measurements of performance include but are not limited to measurements of down time, quality of output products, cost, yield and/or production.

The present invention also provides for display of the determined performance measurements to operations personnel during processing. Further, the performance measurements change or are recalculated with the constant sensing of the state of the process means and hence manufacturing operations, and thus are herein referred to as "dynamic performance measurements". Such dynamic performance measurements are not only more accurate than prior art financial based performance measurements by being based on in-process information instead of post-process quantity of product made, but are also more useful to operations personnel by being provided/displayed in a timely (real time) manner which enables operations personnel to readily make necessary adjustments to increase performance of current plant operations.

Said another way, the present invention provides (i) dynamic performance measures which are calculated right off the production process using real time, preferably object-based process data, and (ii) results which are displayed in real-time, in a graphical format to the appropriate manufacturing personnel. In a preferred embodiment of the present invention, the results are also historized into a real-time database management system for later use, aggrandizement, and integration with other computer information systems of the manufacturing plant.

Figure 1:
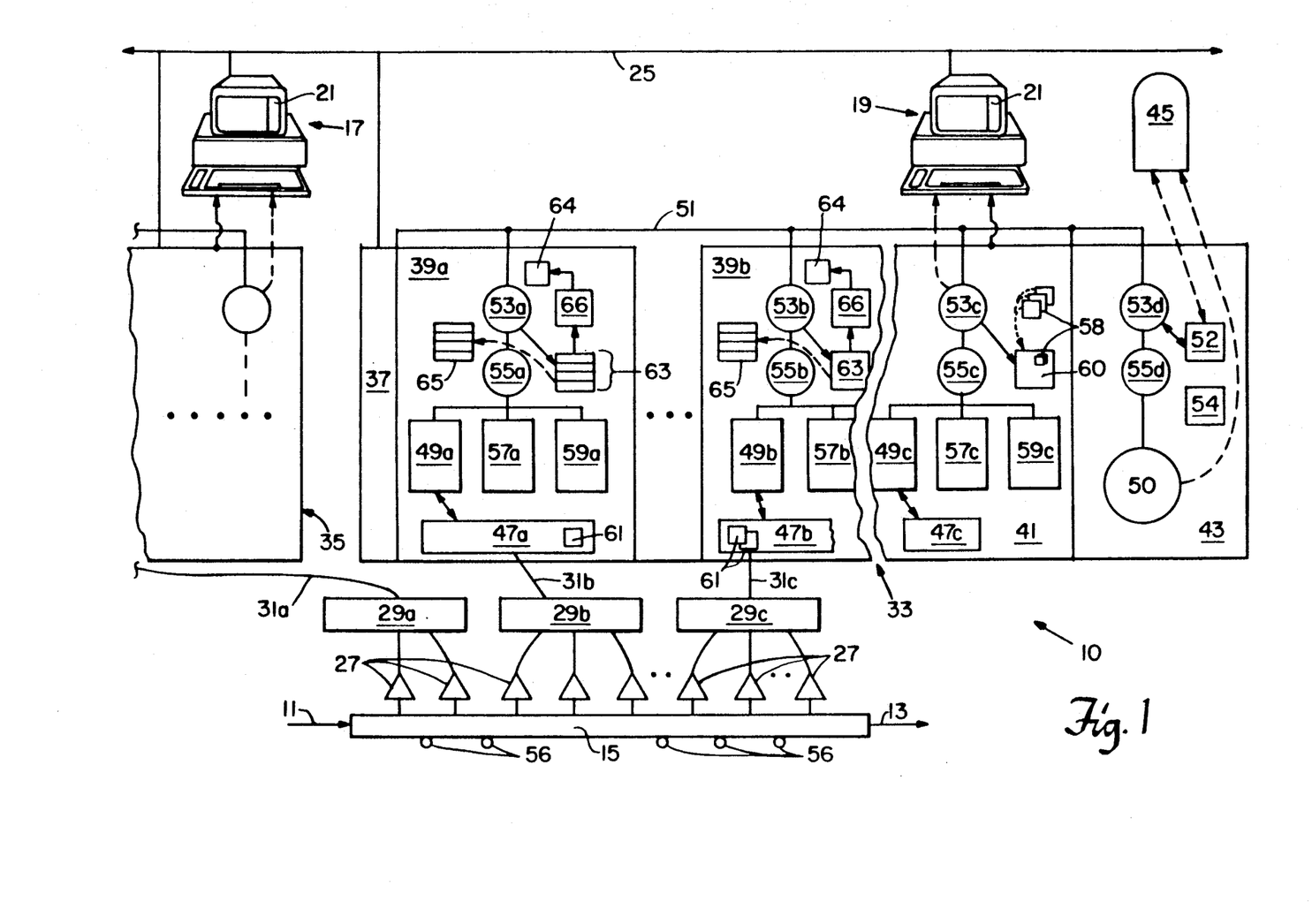
FIG. 1 is a schematic view of an embodiment of the present invention employed in a manufacturing or process plant.

Illustrated in FIG. 1 is a general manufacturing or process plant control system 10 that embodies the present invention. Manufacturing operations begin at 11 and involve processing through a series or pattern of process means collectively indicated at 15. The final (output) product or batch thereof exits the manufacturing operations at 13. The process means 15 include vats, mixers, heating units, conveyer belts, pumps, transfer lines together with valving assemblies and the like for performing various processes required to make the various products of the plant.

Operating personnel of the plant control the process means 15 in a manner such that a desired amount and kind of output product is produced in a given work period. The controllable aspects of the different process means 15 and hence processes of the manufacturing operations include pressure, temperature, flow volume, flow rate and the like as is known in the art. The operating personnel control these aspects of the process means through various control means 56 including valves, heating units, venting units and the like. Operation of the controls 56 may be manually or through a computer processor (electronic means) as known in the art.

In order for operations personnel to adjust control means 56 in a manner which aids (especially increases performance of) current processing such that quality and/or quantity of output products is improved, the present invention provides a computer program for generating and displaying dynamic performance measurements at each operations personnel workstation 17, 19 of the plant. Each workstation 17, 19 includes various I/O devices coupled to the computer processor such as a video display 21 and keyboard. Also, workstations 17, 19 are supported by respective workstation processor modules 41 (described later) which enable the different workstations 17, 19 of the plant to communicate to each other and to global data bases 45 over a carrier band local area network (LAN) 25 or other suitable bus assembly. Upon command by an operations person at a local workstation 17, 19, the computer program provides screen views on the workstation video display 21 which present (a) indications of plant performance based on current state of manufacturing operations, (b) indications of predetermined desired or target levels of performance of manufacturing operations, and/or (c) indications of adjustments (direction and amount) to process means which are necessary to increase or optimize performance of the manufacturing operations.

The computer program is preferably an object-oriented program. The necessary objects and their functionality are described after a discussion of the hardware/computer processing environment in which the preferred embodiment is implemented.

In the preferred embodiment, the process means 15 of the manufacturing operations are thought of as grouped according to local workstation 17, 19 of operations personnel responsible for overseeing the process means 15. Referring to FIG. 1, sensors 27 are coupled to the process means 15 to detect temperature, pressure, volume, weight, flow volume, flow rate and other desired physical and/or chemical aspects of the process means 15. Such sensors 27 include but are not limited to temperature sensors, pressure gauges and the like for detecting the desired physical and/or chemical aspects. The sensors 27 of a group of process means 15 which correspond to a workstation 17, 19 generate analog or digital signals which are received by field bus modules 29a, 29b, 29c of the workstation 17, 19.

The field bus modules 29a, 29b, 29c convert and format the received sensor signals as described in Product Specifications PSS 21H-2B1 B3, "Intelligent Automation Series Fieldbus Modules" by the Foxboro Company, Foxboro, Mass. and herein incorporated by reference. Each field bus module 29a, 29b, 29c of control system 10 transmits across a field bus 31a, 31b, 31c, preferably of the multidrop type, the converted and formatted digital sensor signals to computer node 35, 33 which supports the workstation 17, 19. The supporting computer node 33, 35 is formed of a plurality of processor modules and an interface module to the LAN 25. Each processor module has its own operating system 53 and applications environment.

Shown in FIG. 1, the supporting computer node 33 of workstation 19 includes a LAN interface module 37, a plurality of control processor modules 39a, 39b, a workstation processor module 41 and an application processor module 43. The workstation processor module 41 interfaces to the workstation 17, 19, and the application processor module 43 interfaces to bulk storage and in particular to a global database 45 described later. It is the control processor modules 39a, 39b which receive across respective field buses 31b, 31c the converted and formatted sensor signals from the corresponding field bus modules 29b, 29c.

Each control processor module 39a, 39b receives converted and formatted sensor signals from a respective field bus module 29b, 29c and stores them in local memory 47a, 47b In object oriented program structures called input blocks 61. Each input block 61 is assigned a block name and the block name is catalogued in the control processor modules 39a, 39b object or datapoint directory 49a, 49b. Each entry in the directory 49a, 49b also provides a pointer or other memory address indicator to the corresponding input block 61.

The workstation processor module 41 similarly holds data in local memory 47c as object oriented blocks. Names of these blocks and corresponding memory addresses are catalogued in object directory 49c of the module 41.

Each of the control processor modules 39a, 39b and workstation processor module 41 and application processor module 43 employs an object manager 55a, 55b, 55c, 55d which manages the import and export of input and other data blocks, more accurately referred to as objects and data points, between modules of a supporting computer node 33 as well as between modules of different supporting computer nodes 35 along the carrier band LAN 25. To accomplish the former, a serial backplane 51 provides communication between the modules 37, 39, 41, 43 of a supporting computer node 33. The operating system 53a, 53b, 53c and object manager 55a, 55b, 55c of each supporting computer node module maintains an import list 57a, 57b, 57c of objects (e.g. input or data blocks) not found locally in the module and, hence, required to be imported from other modules in order to execute certain processing. The import list 57a, 57b, 57c indicates objects memory addresses or locations which are known to the module. For those objects indicated in the import list 57a, 57b, 57c which the module does not know the respective memory address, the object manager 55a, 55b, 55c of the module establishes an object list indicating those objects. The object list also specifies the requesting module 39, 41.

The object manager 55a, 55b, 55c broadcasts the object list across the serial backplane LAN 51 to the other modules 39, 41 of the supporting computer node 33. The object manager 55a, 55b, 55c of each of the (other) receiving modules 39, 41 compares the object names on the received object list to the object names on the object or datapoint directory 49a, 49b, 49c of the respective receiving module 39, 41. For each requested object name found on the respective module object directory 49a, 49b, 49c, the object manager 55a. 55b, 55c of the receiving module 39, 41 places the object name and memory address from the directory on an export list 59a, 59b, 59c of the module. Along with the object name and address, the object manager 55a, 55b, 55c places a user specified value in the export list 59a, 59b, 59c. This value serves as an exception value such that the block entered in the export list 59 is not transferred for values within the exception value.

The object manager 55 of each module 39, 41 of a supporting computer node 33 routinely (preferably about every half second) checks the exception values on the export list 59 of the respective module 39, 41. For the listed objects with values outside of the respective exception values, the object manager 55 of that module 39, 41 transmits across the serial backplane 51 to the requesting module 39, 41, the memory address of the requested object. Upon receipt of the object address, the requesting module operating system 53a, 53b, 53c through the module object manager 55a, 55b, 55c records this address in the modules import list 57a, 57b, 57c next to the name of the requested object. Common handshaking and other protocol between the operating system 53a, 53b, 53c of the exporting module 39, 41 and that of the requesting module 39, 41 is subsequently performed before the object manager 55a, 55b, 55c of the exporting module transmits the requested information from the object.

At a subsequent time, the operating system 53a, 53b, 53c of the requesting module 39, 41 may cease the further transmission of the requested object information as desired, by transmitting across the serial backplane 51 a pertinent message to the operating system 53a, 53b, 53c of the exporting module 39, 41. The operating system 53 of the exporting module 39, 41 responds to the pertinent message by directing the object manager 55 of the exporting module to erase the name of the subject object from the exporting module's export list 59.

The global or network wide requesting and receiving of a desired object is performed in a manner similar to the foregoing. Additionally, broadcast of the request for a desired object and response for the module to transport the address of the requested object is transmitted across the broad band LAN 25 via the LAN interfaces 37 of the different supporting computer nodes 33, 35.

Thus, the object managers 55 of the supporting computer nodes 33, 35 enable objects (e.g. input/data blocks) to be accessed by name instead of memory location or address wherever in the network the object may be stored.

The operating systems 53a, 53b of the control processor module 39a, 39b executes the computer program of the present invention with the sensor data accessed through object managers 55 as described above. To that end, the computer program at operating system 53a,b provides the dynamic performance measurements of the process means 15 for which the operator at workstation 19 is responsible. Implementation details of that computer program are discussed next in conjunction with the flow chart of FIG. 2.

The actual dynamic performance measures required for a particular plant operation are a function of the manufacturing strategy that has been developed for that operation. The dynamic performance measures that are most appropriate for process means or a group thereof in one plant may not be appropriate at all for the same of a similar but different plant. For example if a plant is production limited, the primary measures will tend to be yield or some other production based statistic, but if the plant is not production limited, the measures may be more resource based. Therefore the first two steps 67, 68 of FIG. 2 in the implementation details of a computer program for generating dynamic performance measures is to determine the manufacturing strategy for the plant, and translate that strategy to specific measurements that should be made to determine if the strategy is working, on a process means (or group thereof) by process means (or group thereof) basis.

By way of example and not limitation, in a paper mill, performance strategy of a continuous digester focused on production rate, quality within predetermined limits and stability of the digester such that the digester is operated in a smooth and continuous manner. As a consequence, the measurements to determine if the strategy is working include chip meter rpms, amount of production below the expected amount, start time of the digester, time to return to peak production after slowdown period of the digester, quality K number, lower cook conductivity, amount of time the K number was out of specification limits, amount of time digester level is out of target zone and time required to stabilize from upsets in digester level or chip bin level. Also, occurrences of the number of kickouts of a top separator feeder, lack of net upflow in the digester, or rate variation in the chip feeder rate greater than a target value can all be recorded for improvement work. Level control in a number one blow tank is a measure of the balance between the digester and washers, and the amount of change during a shift is representative of the stability of the two operations.

Once the specific measures are determined, the sensor information required 71 to make the measures has to be determined. In many process plants, the sensors 27 required to make the measures will already be installed in the process or with the process means of interest. In some cases, new sensors need to be installed to complete the collection of sensor-based information required to measure the performance of the manufacturing operations at a particular process means or group thereof.

The next step 69 in the implementation process is to be sure that the required sensor-based information is directly connected to the supporting computer nodes 35, 33 of the pertinent workstation 17, 19. This is typically done in one of two basic ways. The transmitters associated with the sensors 27 can transmit an analog signal that represents state of the process means or process 15 along a predefined continuum, or the transmitters can transmit a digital signal to the supporting computer node 35, 33. Each supporting computer node 35, 33 is equipped with appropriate input/output capability to receive the sensor-based information.

At this point 73 in the implementation process, the object oriented programming structures called input blocks 61 (FIG. 1) are constructed for each the required sensor-based inputs. These blocks 61 convert the incoming sensor signals into digital values in the engineering units required for the dynamic performance measurement calculation discussed later. Each input block 61 is formed of a collection of records or fields, each of which holds particular sensor data. The input block 61 also provides general system access to the sensor data by name, where the global name is based on the name assigned to the input block 61. This data point or "object" value is now available to any application in the network by specifying the name of any input block 61 or the name of the field or record of interest in the input block 61. Alarming can also be provided at this point 73 (FIG. 2) if desired.

Figure 2:
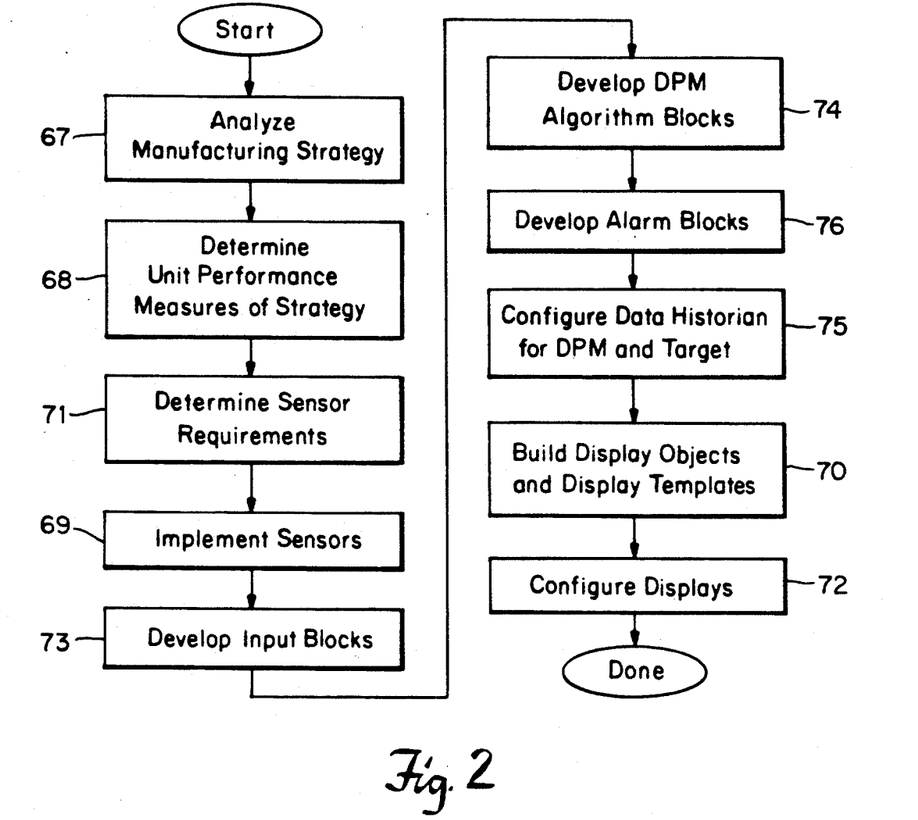
FIG. 2 is a flow diagram for implementation of the embodiment of FIG. 1 including a software program employed therein.

The next step 74 in the implementation process of FIG. 2 is to construct the calculation algorithms for the dynamic performance measures of interest. The calculation algorithms mathematically state the measurements established at 68 of FIG. 2 that determine if the manufacturing strategy is working and generally are common or determinable mathematics. Also the calculation algorithms include target, predetermined values and comparisons between currently calculated values and the target values. For example if a sensed flow rate from a last mixing vat in an operation is 8 units/hour, the production rate for the operation personnel whose shift is known to last 10 hours can be currently determined at 80 units/shift This calculation can be made anytime in his shift with current sensed flow rate data. Additional calculations compare the calculated 80 units/shift to a predetermined target value of 85 units/shift and provides output indicating that the current flow rate of the mixing vat should be increased by 0.5 units/hour (i.e. (85-80) units/10 hrs) to provide ideal operation/performance.

For each calculation algorithm, an object oriented programming based block structure is established. These "algorithm" blocks 63 (FIG. 1) can be preprogrammed for dynamic performance measurements that are frequently encountered or they can be programmed as the need arises. The sensor-based data as represented by input blocks 61 (FIG. 1) developed in the previous steps 73 are used as input to the algorithm blocks 63 (FIG. 1). This is accomplished by specifying in the algorithm block 63 the name of the input block 61 and the input block parameter (field or record) of interest. In executing the algorithm block 63, the operating system 53a,b of the control processor module 38a, b, in which the computer program of the present invention resides, requests and obtains the sensor-based data in the specified input block 61 (as described previously) and performs computations on the obtained input data as directed by the mathematical relationships set forth in the algorithm block 63.

The output of the algorithm block 63 becomes a global object 65 (FIG. 1) in the network that can be accessed from anywhere in the network by specifying the name of the producing algorithm block 63. The computed values in this output object 65 serve as the basis for the dynamic performance measures of interest.

An example (by way of illustration and not limitation) of a dynamic performance measure algorithm block 63 is as follows. Assume that the manufacturing operation (i.e. produced by a group of or a single process means) under consideration is not production related, but requires significant resources in terms of raw material, catalyst and energy to perform the desired operation. The algorithm block 63 in this case would set forth a resource cost relationship of the type:

$$RC = M1*C1 + M2*C2 + M3*C3 + (Cat1 - Cat2)C4 + E1*C5 + E2*C6$$

where:
RC is the dynamic resource cost;
M1, M2, and M3 are the quantities of the three raw materials used in a given period based on sensor-based data;
C1, C2, and C3 are the respective cost factors of the raw materials per unit measured;
Cat1 is the amount of catalyst at the beginning of the operation (sensor-based;
Cat2 is the amount of catalyst recovered after one cycle of performance of the operation (sensor-based);
C4 is the cost of the catalyst;
E1 is the amount of energy used in the unit operation for the given period (sensor-based);
C5 is the cost of E1 per unit consumed;
E2 is the amount of energy used in the catalyst recovery operation (sensor-based);
C6 is the cost of E2 per unit consumed.
It should be noted that the cost factors, Cn, could either be constants in the algorithm block 63, or could be provided by another computer information system of the plant based on current market conditions. Also, a target value of resource cost may be stated in the algorithm block 63 as a constant or variable to which the dynamic (above calculated) resource cost is compared. The comparison can provide a numerical output which is subsequently useable as a dynamic performance measurement.

Other examples of algorithm blocks are as follows for the paper mill digester. Start-up time of the digester is defined in a mathematical relationship as the time from initial feed start to the point when both rpm and K number are within specification limits. A timer is triggered by the start of the chip meter (sensor-based) and continues to accumulate time counts until the production conditions are satisfied. The operating system 53a,b of the control processor module 39a,b constantly computes rpm and K number, according to common definitions thereof and using sensor based data, until both are within specification limits. At that moment, the timer is stopped. Some rules for interpolating K number data to indicate when the K number is actually within range may be employed. The output of the algorithm block 63 provides the elapsed time from the timer for the startup time of the digester.

An example of a performance measure based on a K number is provided next. The normal trend of K number accumulated over time is sued as a base to monitor the amount of time that the number is out of the control range. The algorithm block 63 accumulates the total time during the work shift that the K number is out of range. This total time accumulated is the output of another algorithm block 63.

Digester level control is another opportunity for measuring performance. An algorithm block 63 may determine trending level and monitor the time the digester level is outside of the control limits during a work shift. The accumulated time is provided as the algorithm block 63 output and provides an indication of stability of the control system.

It is appreciated that there are a number of approaches to the development of the algorithm blocks 63 of the present invention. It is understood that one skilled in the art is familiar with the pertinent subroutines for running addition, subtraction, multiplication, division, averaging percentage calculations and the like. If the calculations of interest are reasonably simple, and the number of sensor inputs is eight or less and the number of dynamic performance measurement outputs is four or less, a simple calculation block can be implemented. Such a calculation block is formed of up to fifty programming steps or lines of code. These steps can be thought of as attributes of the object calculation block. The object calculation block outputs are also specified in the block. A calculation of resource cost like in the previous example could easily be implemented in this manner (e.g. directly recited in the calculation block). Further details of calculation blocks are provided in Product Specification sheet (PSS 215 3-B7 B4) by The Foxboro Co , Foxboro, Mass. herein incorporated by reference.

If the analysis required to calculate the base dynamic performance measure of interest is more complex, a "sequence" block can be utilized. A sequence block is an object oriented programming structure that allows for more general programming steps (attributes) to be constructed, and accommodates a larger number of steps. Sequence blocks are preferably programmed in a high level language that is similar to PASCAL.

In the preferred embodiment, sequence blocks manipulate any compound (i.e. collection of related blocks), block parameter or shared variable (i.e. a linkage between an application and a control database). Sequence blocks also activate other sequence blocks and monitor blocks, and send messages to historians as discussed later. A monitor block monitors up to sixteen process conditions and is configured of parameter values and Boolean expressions. In a tripped state (one of the monitor blocks conditions is true), the monitor block activates a sequence. All sixteen conditions act independently.

A sequence block may be of a dependent, independent or exception type. A dependent sequence block's execution is automatically delayed while any exception sequence block that is nested in the same compound is running. An exception sequence block's execution, on the other hand, is never delayed. The independent sequence block's execution does not affect the execution of other sequences nor does the execution of other blocks affect the operation of independent sequence blocks.

A sequence block has the states of inactive, active or paused. The inactive state means that a sequence block is not executing statements or that a monitor block is not evaluating conditions. The active state means that a sequence block is executing statements or that a monitor block is evaluating conditions. The paused state means that a dependent sequence block is in a suspended condition. The dependent sequence blocks pause whenever an exception sequence block in the same compound becomes active. The dependent sequence block becomes active again when the exception sequence blocks complete their execution.

A compound parameter SSTATE shows the operational behavior of the sequence block states within that compound in one of three values:

inactive—neither the sequence blocks nor the monitor blocks nested in the same compound are active;

active—one or more monitor blocks; and/or one or more dependent sequence blocks; and/or one or more independent sequence blocks that are nested in the compound are active;

exception—one or more exception sequence blocks nested in the compound are active.

Sequence blocks run in parallel with each other in that a) sequences may be active concurrently and b) monitor blocks may be active in parallel with sequence blocks. Timing is an independent feature and can run in parallel with the other blocks.

Figure 3:
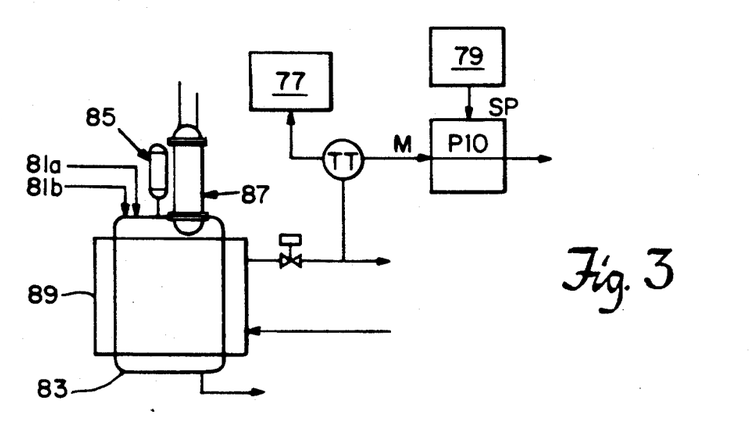
FIG. 3 is a schematic illustration of a group of process means in a plant which may be represented in a sequence programming block in the software of FIG. 2.
Figure 4:
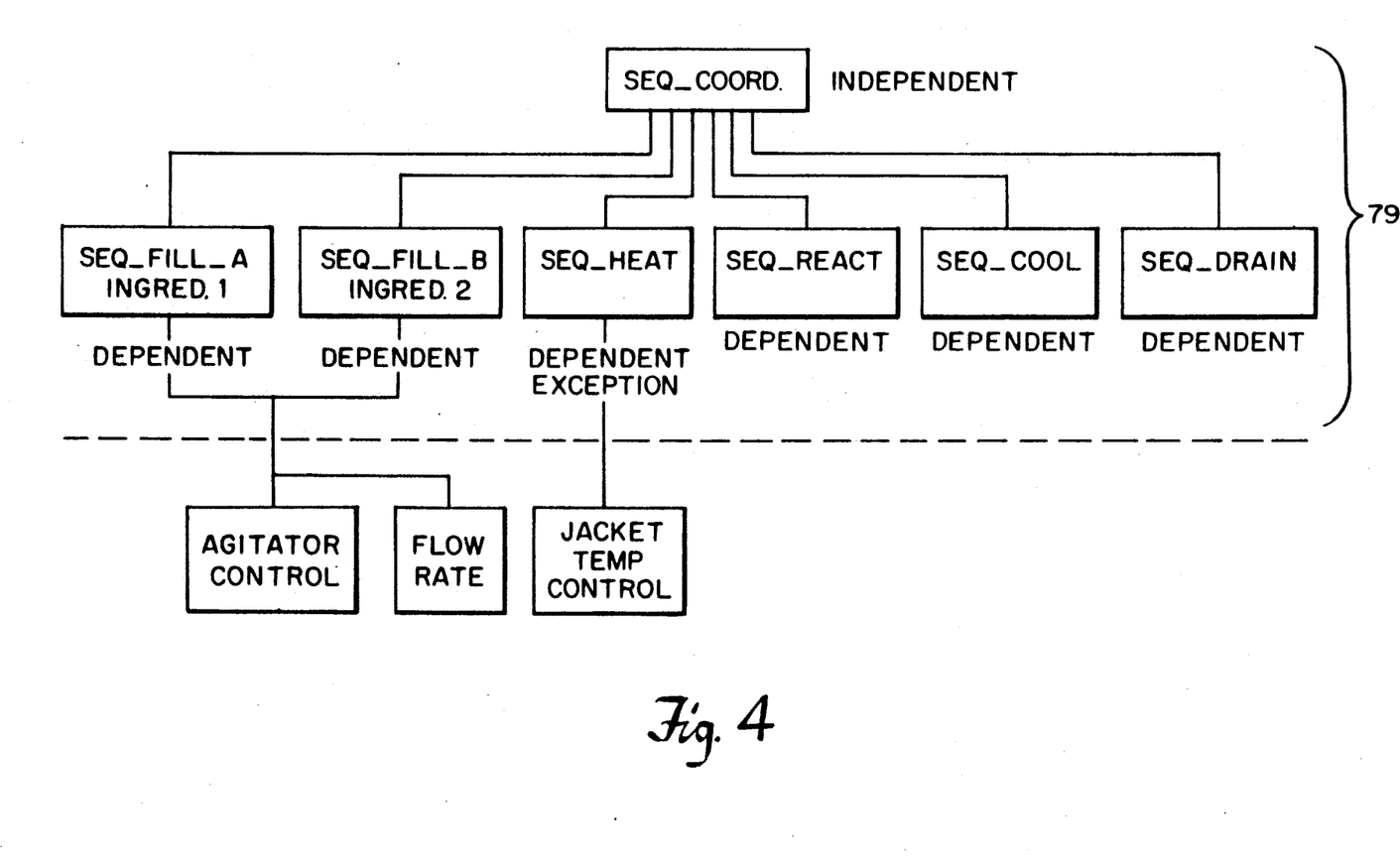
FIG. 4 is a schematic flow diagram of the sequence programming block of FIG. 3.

Also sequence blocks contain logic that supervise control loops. The logic regulates such things as pressure control, temperature control, agitator control, ingredient fields, gas control, etc. FIGS. 3 and 4 illustrate one example of how one might use sequence blocks 79 to supervise reactive control flow loops. The intent of this example is to show just a few control loops rather than a complete control strategy. FIG. 3 shows a reactor 83 having two ingredient inputs 81a, 81b, an agitator 85, a condenser 87 and a heat jacket 89. Briefly, under control of a set of program sequence blocks 79 (FIG. 4), the reactor 83 and surrounding elements operate as follows. In response to a control signal, inputs 81a and 81b allow respective ingredients to concurrently flow into and fill the reactor 83. In turn, temperature of the heat jacket 89 is controlled and monitored by control block labeled PID and monitor block 77 in FIG. 3. That is, as inputs 81a and 81b allow respective ingredients to flow into reactor 83, monitor block 77 controls jacket temperature alarms. Under subsequent control signals from sequence block 79, agitator 85 and condenser 87 are activated in proper sequence and for proper respective lengths of time to mix and condense, respectively, the ingredients in reactor 83 while working temperature of the reactor is controlled and monitored by monitor block 77 through heat jacket 89. Thus, there are a variety of continuous control loops from ingredient input to maintaining working temperature involved in the operation of the reactor 83.

In FIG. 4, a block flow diagram shows sequence blocks 79 within a compound structure coordinating the continuous control loops in the FIG. 3 example. Blocks illustrated above the broken line in FIG. 4 indicate sequence blocks 79 and those shown below the broken line are processes which once activated run continuously.

In the example of FIG. 4, the SEQ_COORD, an independent block, is coordinating activities in the dependent blocks. The first action that the independent block takes is to activate dependent blocks SEQ_FILL$_{13}$A and SEQ_FILL_B. The dependent blocks SEQ_FILL_A and SEQ_FILL_B start to fill the reactor 83 with two ingredients concurrently. The SEQ_FILL_blocks then send a set point to a PID (Proportion Integral and Derivative) control block (FIG. 3), start the jacket temperature control loop and start the monitor block 77 to watch the jacket temperature. The SEQ_FILL blocks also activate an agitator control and flow rate processes which, once activated, run continuously. The agitator control process controls operation of agitator 85 in FIG. 3. SEQ_FILL blocks continue adding ingredients to the reactor. They no longer need to worry about the jacket temperature alarms since a monitor block 77 (FIG. 3) is doing this. If the jacket temperature exceeds the alarm limits, monitor block 77 activates an exception block SEQ_HEAT to correct the situation. When exception block SEQ$_{13}$HEAT is active within the compound structure of FIG. 4, the dependent blocks within the compound structure pause (i.e. SEQ$_{13}$FILL_A, etc.). However, independent blocks continue to execute. When the SEQ$_{13}$FILL_blocks reach completion, they turn off the monitors associated only with SEQ$_{13}$FILL.

The rest of the sequence blocks of FIG. 4 are activated in series from SEQ$_{13}$REACT to SEQ_DRAIN. Dependent block SEQ_REACT activates reactor 83 (FIG. 3) to produce the desired reaction with the provided ingredients and reactor environment (temperature). Upon completion of SEQ_REACT, dependent block SEQ_COOL decreases temperature of reactor 83 and/or heat jacket 89 as required for the desired reaction. This involves operating condenser 87 to effect cooling by evaporation and the like as is common in the reactor art. Upon completion of SEQ_COOL, dependent block SEQ_DRAIN opens pertinent valves of reactor 83 to drain fluids (air, liquids, etc.) from reactor 83.

In order to meet the general progamability requirements for complex perfomance measurements calculations of the present invention, a suitable sequence block language must be employed. The sequence block language employed in the present invention is preferably a subset of the I/A series systems (trademark of the Foxboro Company, Foxboro, Mass.) high level sequential language. It is a structured language somewhat like the programming language PASCAL. However, its focus is on control applications. The language includes logic flow control statements as well as Boolean and arithmetic functions. Refer to Table I for a sample block built with the sequence language.

Table I illustrates a sequence block for calculating a performance measurement based on incurred resource cost. A variable RESCOST holds the output resource cost value calculated by this sequence block. The value held by RESCOST is calculated as a function of usage of catalysts REACT1:CATN.OUT which are defined by a catalysts block, material costs REACT1:TOTN.OUT which are defined by material totalizer blocks, and energy costs REACT1:ENERGYN.OUT from energy totalizer blocks. Specifically, RESCOST=R5+9.4(REACT1:ENERGY2.-RO01),
where
R5=R4+12.2(REACT1:ENERGY1.RO01);
R4=R3+4.3(REACT1:TOT1.RO0.1);
R3=R2+7.3(REACT1:TOT2.RO0.1);
R2=R1+2.5(REACT1:TOT1.RO0.1); and
R1=4.2(REACT1:CAT1.PNT−REACT1:CAT2.PNT).

The language statements do not operate the I/O (input/output) directly. Rather, they make connections between their own parameters and I/O block parameters (i.e. input blocks and input block parameters). The language statements write the I/O block parameters within continuous, ladder logic or other sequence blocks which operate the input/output.

Logic flow control statements of the sequence block language determine the flow of computer control. These control statements may select groups of statements to be executed, skip them, execute them repetitively, or delay their execution. The logic flow control statements are:

if ... then ... elseif ... else ... end if
For ... to ... do ... endfor
repeat ... until
while ... do ... endwhile
exitloop
goto
wait ... time
wait ... until condition
exit.

In the preferred sequence block language, there are two kinds of statements that manipulate data, the assignment statement and the procedural statement. The assignment statement replaces the current value of some object with a new value that results from evaluating an expression.

The procedural statements are:
ACTIVATE—activates a sequence block or a monitor.
ABORT—aborts an active sequence block or monitor.
START_TIMER—starts timers at current value or selected value.
STOP_TIMER—stops timers
ACTCASES—manipulates activity of the sixteen monitor block cases.
SENDMSG—initiates a message from executing sequence logic. It can address any object that acts like a logical device such as historians or annunciator keys. It can also assign a message to a string parameter.

Further details of sequence blocks are set forth in Product Specification Sheet (PSS 21S-3K1 B3) of the Foxboro Company, Foxboro, Mass. and herein incorporated by reference.

TABLE I

EXCEPTION_SEQUENCE
{* SEQUENCE BLOCK FOR RESOURCE COST *}
{* DYNAMIC PERFORMANCE MEASURE *}
RESCOST : RO0001;
{* RESCOST IS RESOURCE COST OUTPUT *}
{* OF THIS BLOCK WHICH IS *}
{* OBJECT MANAGER CONNECTABLE *}
{* CALCULATE THE CATALYST USAGE *}
{* REACT1.CATN.OUT IS FROM CATALYST BLOCK *}
STATEMENTS
RESCOST:    4.2 * (REACT1:CAT1.PNT - REACT1:CAT2.PNT);
{* CALCULATE MATERIAL COST *}
{* REACT1:TOTN.OUT IS FROM THE *}

TABLE I-continued

{* MATERIAL TOTALIZER BLOCKS *}
RESCOST:    RESCOST + 2.5 * REACT1:TOT1.RO01;
RESCOST:    RESCOST + 7.3 * REACT1:TOT2.RO01;
RESCOST:    RESCOST + 4.3 * REACT1:TOT1.RO01;
{* CALCULATE ENERGY COST *}
{* REACT1.ENERGYN.OUT IS FROM *}
{* ENERGY TOTALIZER BLOCKS *}
RESCOST:    RESCOST + 12.2 * REACT1:ENERGY1.RO01;
RESCOST:    RESCOST + 9.4 * REACT1:ENERGY2.RO01;
ENDSEQUENCE

The sequence blocks interact with the local object manager 55a,b and operating system 53a,b in a similar manner as all of the other object blocks discussed. All pertinent algorithm blocks 63 (including calculation and sequence blocks) of a control processor module 39 are locally stored in memory of the control processor module.

Since the operation's personnel will use these dynamic performance measures to optimize the performance of their section of the operation (i.e. group of process means), it is often desirable to develop alarming around these measures. Often this will be a low alarm limit, but sometimes such as with a consistency measurement, there may be two limits, one high and one low. This is accomplished at 76 (FIG. 2) by connecting the output of the algorithm block 63 to an alarm block 66 (FIG. 1) in the control processor module 39. At 76 in FIG. 2, the alarm block 66 is configured to set the desired alarm. The alarm limits can be changed by an external call as required by the particular dynamic performance measure and the phase of operation. The output 64 of the alarm block 66 is also a global network object 64, and can serve as the basis for the dynamic performance measures of interest.

In addition to alarms for individual performance measurements, the present invention provides the following. In some cases factors of different performance measurements affect other performance measurements. For example, the resource cost performance measurement described previously is a function of sensed amount of catalyst used and other amounts. If an operations person increases amount of the catalyst used to advantageously increase production time, he also consequently and detrimentally increases the resource cost of manufacturing operations. An alarm block 66 of the present invention provides a blancing between the increase in production and the cost of operations (or any two performance measures of interest). Specifically, the alarm block 66 sets a threshold or ceiling for resource cost. If performance measurements for resource cost exceeds this ceiling at any time during the operations person increasing the amount of catalyst used, the alarm block 66 sounds an alarm such that the operations person knows to stop increasing amount of catalyst used. Other interdependent or commonly affected performance measurements are monitored and balanced in a similar manner in alarm blocks 66 of the present invention.

Figure 7:
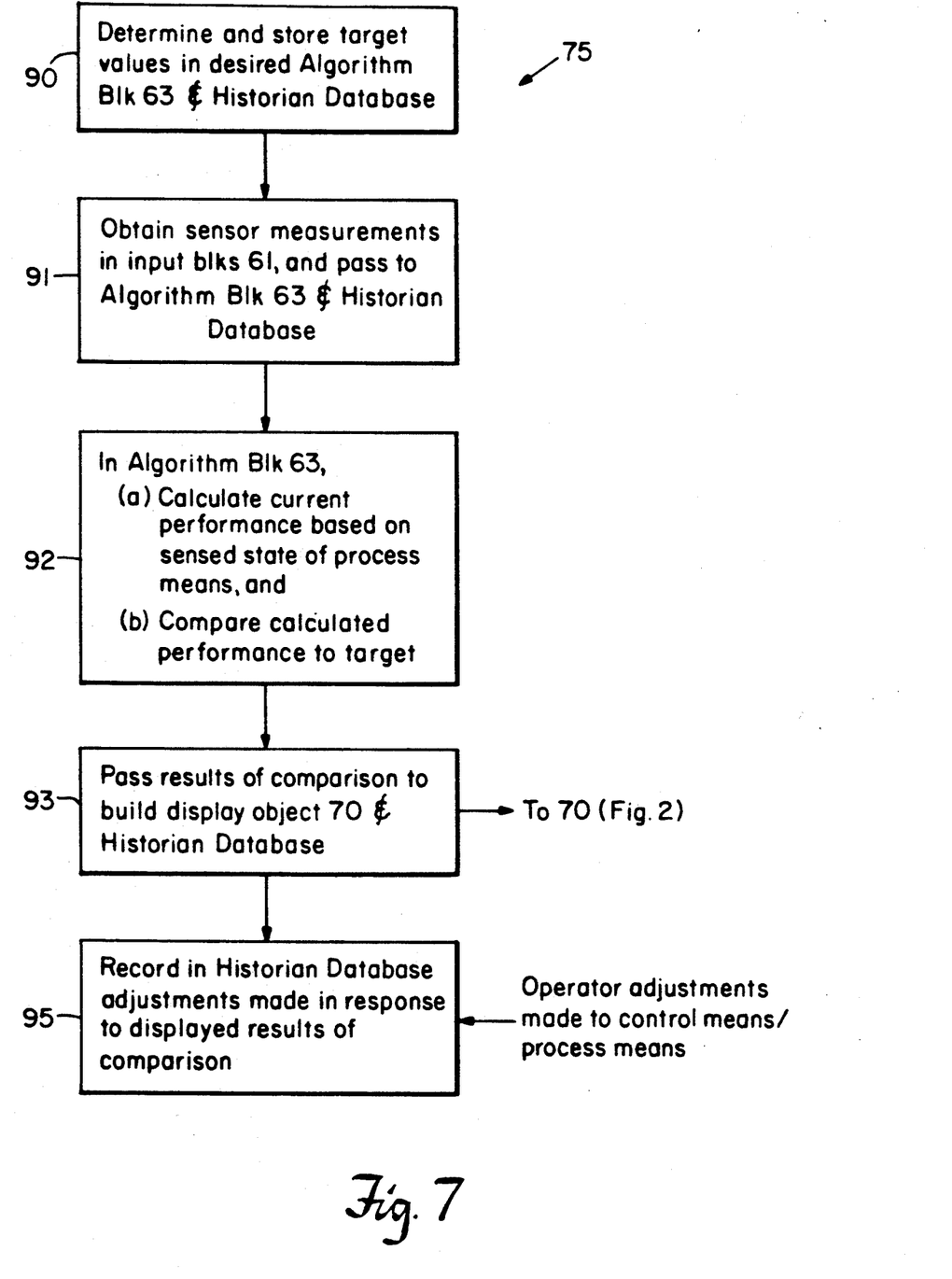
FIG. 7 is a detailed flow diagram of one implementation block in the flow diagram of FIG. 2.

The next step 75 in FIG. 2 (and in more detail in FIG. 7) is to historize the output 64 of the alarm block 66, or if no alarming is implemented, the outputs of the algorithm block 63 (e.g., at 92 and 93 in FIG. 7). This is accomplished by connecting the output of the block of interest to a data historian 50 (FIG. 1) running in an application processor module 43 (FIG. 1) of the supporting computer node of the personnel workstation 19. The application processor module 43 has bulk storage capability. In a preferred embodiment, the operating system 53d of the application processor module 43 employs "INFORMIX" by Informix Co. of California as the database manager 52 for managing and accessing a standard relational database 45. Other database managers that translate user query of a standard query language format into files accessed through a index sequential access method (ISAM) are suitable.

The data historian 50 is configured for the historization of the output data (measures) and an exception band is specified. When the absolute value of the difference between the current value of the output measure and the last value of the output measure is greater than the exception band, the historian 50 stores the historization of the output measure in the global database 45. At least the last 200 significantly changed values of the output measure are saved with a quality tag in the database 45 by the historian 50. The quality tag indicates the validity of the measure, that is, it flags reasonableness of the value. To that end, the program of the present invention or data historian 50 via the quality tag disregards low grade measurments and preferabley use the last value of acceptable grade/quality.

A predetermined dynamic performance measure target value which indicates desired value of the dynamic performance measure may also be historized in a similar manner. Such is illustrated at 90 in FIG. 7. The target value may either be a constant value manually entered into a block and historized from that point, and may be entered into the computer program of the invention from a host computer, that is performing business administration functions. In the latter case, the target value can change in real-time to match the current operational objectives based on economic or other issues of the manufacturing/process plant.

Both historized values can be further historized using data reduction techniques. These techniques operate on a periodic basis and calculate the average, standard deviation, maximum, minimum and/or total value over the specified period. Any combination of the reduction statistics can be used. The historian 50 of the application processor module 43 automatically stores such further historized information in the global relational database 45 for further accessibility. The historian 50 stores this historized information according to the index sequential access method of the database management system 52.

Also, along with determined performance measures and predefined target measures, the data historian 50 stores indications of sensed states of process means (at 91 in FIG. 7), operator adjustments made (at 95 in FIG. 7), and predetermined thresholds for alarms. Preferabley data historian 50 stores this information according to time i.e. along a common time line, in the database 45. A record of status of manufacturing operations at any given time in the past results and is accessible on line from database 45 for analysis by other plant personnel. Such globally available time ordered information of manufacturing operations has not been provided by the prior art systems.

In sum, the step 75 of FIG. 2 is as outlined in detail in FIG. 7. In particular, target values are determined and stored in desired algorithm blocks 63 and a historian database at step 90 in FIG. 7. Subsequently sensor measurements, such as flow rate, volume, amount of resource used, rate of operation, and the like are obtained in input blocks 61 which are passed to algorithm blocks 63 an the historian database. This is illustrated at step 91 in FIG. 7 and provides current sensed state of process means. In turn, the present invention processes an algorithm block 63 as follows and indicated at step 92 in FIG. 7.

In an algorithm block 63 the current overall performance of manufacturing operations is calculated as a function of the sensed aspects of the process means. The calculated current performance measurement is then compared to the target desired performance measurement as stored in algorithm block 63 or in the historian database. The results of that comparison are passed to the build display object step 70 in FIG. 2, and to the historial database as indicated at step 93 in FIG. 7.

Subsequent to the building and displaying of the comparison results in various display objects, an operator/user adjusts control means and hence adjusts process means accordingly. That is, real time display of the comparison of calculated current performance to predetermined target performance in terms of production/resource factors of administration, enables operator adjustment of process means, and hence resource/production factors, immediately during subject manufacturing toward target performance, i.e., toward desired values of resource/production factors. Those adjustments are recorded in the historian database at 95 in FIG. 7. As a result the historial database stores indications of sensed states of process means, operator adjustments made, calculated performance measurements and predefined target measures as discussed above.

The next step 70 in the implementation process of FIG. 2 is to build the display objects 58 and display templates 60. Once again, the precise manner in which the measures are displayed on the workstation video display 21 (FIG. 1) is a function of the operation and the personnel involved. A display object 58 is a programming entity that can become part of a total screen display by specifying the display object name and where on the display template 60 it should be located. The display template 60 is the graphic structure of a total screen display and corresponds to a bitmap of the video display 21 of the workstation 17, 19.

Figure 5:
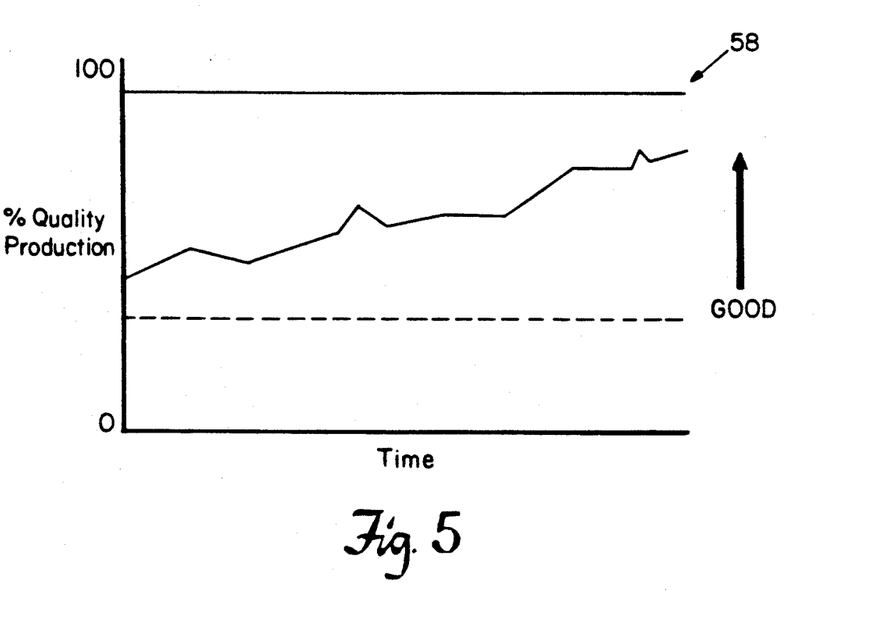
FIG. 5 is a schematic illustration of a screen view graph displayed in the embodiment of FIG. 1.

Display objects 58 which are constructed for standard presentations of the dynamic performance measures include line graphs that depict the dynamic performance measure value over a period of time (historized), an indication of the dynamic performance measure target value, an indication of the alarm limits, the x and y axes with desired labels and a directional indicator showing the direction of increasing performance. These display objects can be combined with other graphics to build the entire display template 60 as commonly done in the computer art. An illustration of a line graph display object 58 depicting performance measure of quality over time is provided in FIG. 5.

The final implementation step 72 (FIG. 2) is to configure the display. This is accomplished by the present invention computer program setting forth the template 60 of choice and specifying the datapoints (display objects 58) that should dynamically drive the graphics once execution of the program is initiated. The connections to the graphics can come from network objects, or the historian 50 or both. It is understood that one skilled in the art is familiar with the pertinent subroutines for configuring the graphics. Once the graphic is configured, the program provides the video display 21 screen views of a dynamic performance measure system of the present invention.

Figure 6A:
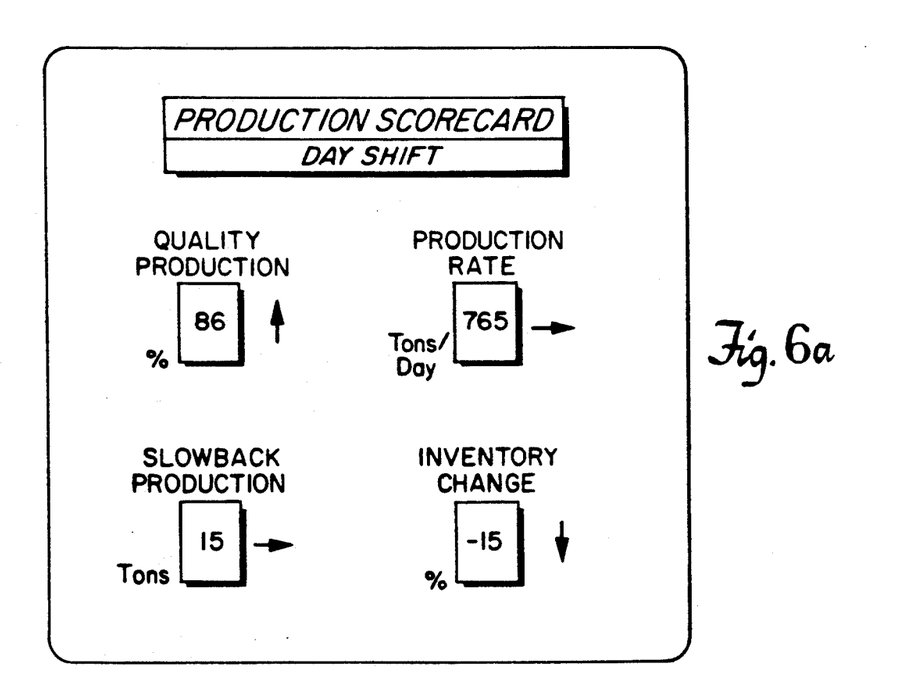
FIGS. 6a–6c are schematic views of screen views displayable in an embodiment of the present invention.
Figure 6B:
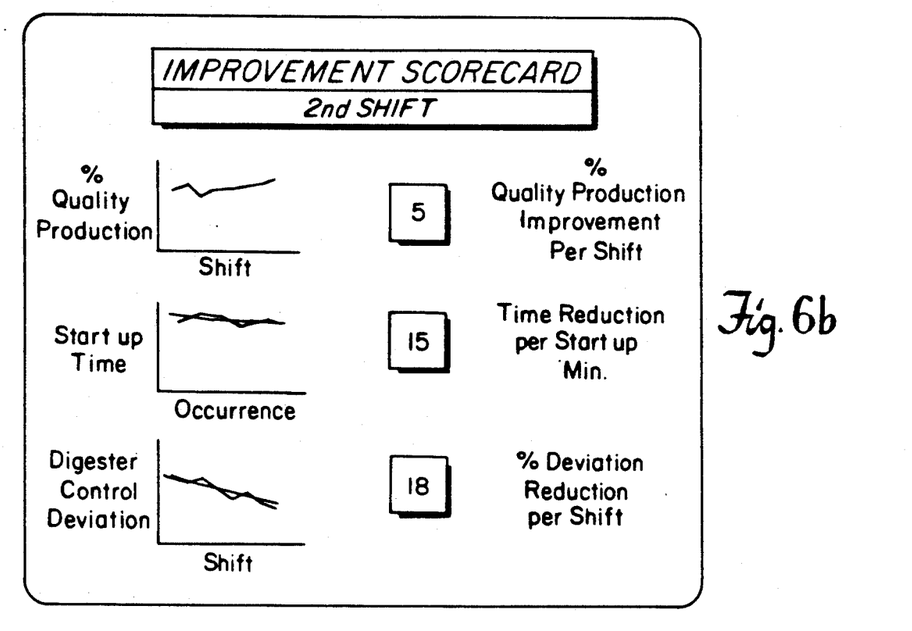
Figure 6C:
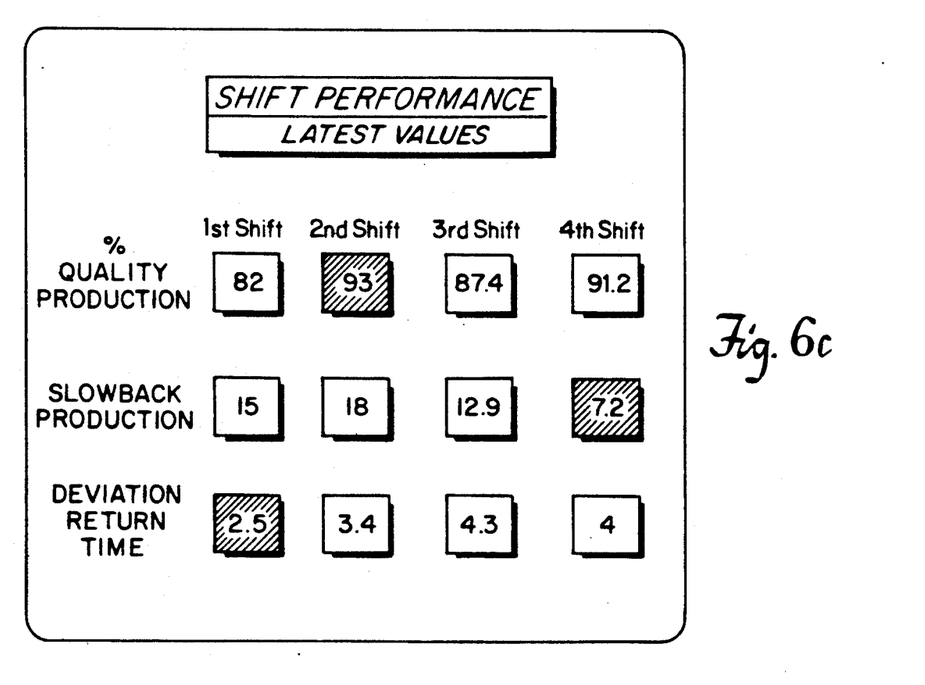

Examples of screen views displayed on a workstation 17, 19 video display 21 for the mill digester example are provided in FIGS. 6a–6c. The display objects utilized in FIG. 6a include dynamic performance measure values (algorithm block output 65) and directional indicators showing direction of change manufacturing operations have taken over a unit of time (e.g. 1 hour). The screen view of FIG. 6b utilizes line graphs over time, target value indications on the graphs and performance improvement measures. With this screen view being displayed an operations person may change operation of a process means or group thereof to see how the change affects performance of overall manufacturing operations. Any effects on performance of a certain measureable amount are reflected in pertinent graphs and quantitative measurement indications displayed in the screen view (FIG. 6b) which change with the dynamic performance measurements calculated by the present invention program. This real time feedback enables the operations person to quickly and readily adjust process means for which he is responsible to obtain and maintain desired performance of manufacturing operations.

If performance measures are to be included with other plant reports, then comparisons of values between work shifts will be natural. The screen view illustrated in FIG. 6c is designed to reflect the latest status of the various performance measures for each work shift. Best performance measurements may be highlighted, and the values may be displayed as numeric values or possible bar charts from a spread sheet program as is common in the art.

Alternatively, the performance measurement values could be based on operator responsibility time which would start two hours into a work shift and carry over two hours into the next shift. This provides a more accurate reflection of the performance measures for a particular operator.

Using the foregoing described object blocks, the present invention computer program is configured with means and methods common in the computer programming art to provide the following features. Each of the input blocks 61 connected to the sensor based inputs 31, operates at a base frequency of from about 0.1 seconds to several minutes. At execution time of the program, the input block 61 is processed by sensor signal receiving field bus module 29 providing sensor data to control processor module 39 of the workstation supporting computer node 33. The input sensor data is read and converted to the appropriate engineering units, if necessary, and the new value is stored in the input block 61 in local memory 47 of the control processor module 39.

When the object manager 55 in the control processor module 39 in which the input block resides, executes on its periodic basis (as often as every half second), it compares the new input value in the input block 61 with the last value sent to pertinent algorithm blocks 63 to see if a sufficient change has occurred. If a sufficient change has occurred, the object manager 55 sends the new value to the pertinent algorithm blocks 63.

Each algorithm block 63 also executes at a configured frequency. On the frequency interval, an algorithm block 63 is processed by the operating system 53a,b of the control processor module 39. In this processing, the operating system 53a,b reads the inputs from the indicated input blocks and processes the dynamic performance measure calculation which results in an algorithm block output 65. The algorithm block output 65 is passed to the alarm block 66 of the control processor module 39, historian 50 of the application processor module 43 and/or screen display module depending on the options set forth in the computer program, according to the amount of change that has occurred with respect to the immediately previous algorithm block output 65.

The alarm block 66 of the workstation processor module 41 typically runs at the same frequency as the algorithm block 63. The alarm block 66 checks the current output values from algorithm blocks 63 against respective alarm limits and if necessary sends alarm messages to the appropriate target location. Often the target location for alarm messages is an operator's workstation 17,19 and the alarm message subsequently results in the sounding of a horn and the flashing of various alarm indicators.

Each data point historized by a data historian 50 in the application processor module 43 has both an exception band (change limit) and a base frequency specified. At the base frequency for a dynamic performance measure, the historian 50 determines if a new value has been sent from the alarm block 66 or the algorithm block 63. If not, nothing is done. If so, the new value, the time of the change and the quality tag is stored in a real-time historical buffer 54 (FIG. 1) for that data point. Normally the historical buffer 54 is 200 change values in length, and once 200 values have been written, the historical buffer 54 will overwrite entries beginning with the oldest entry in the buffer. The buffer 54 can be extended beyond 200 values if extended real-time historical trending is desired.

The historical data is further reduced by specifying a historical reduction operation or set of operations at a given time frequency. For example, the average and standard deviation of the values can be calculated every 15 minutes for one day. Further reductions can be set up as needed.

Either the real-time historical data or the reduced historical data or both may be displayed on the workstation video display 21. This allows the operations personnel to see how operations are currently doing and to compare the current performance of the operations with performance of a previous time period, for example, yesterday at the same time of the day. Such time ordered information provides advantages over prior art performance measure systems by enabling real time in process evaluations to be made by operations personnel. In turn, operations personnel are able to make necessary adjustments to increase performance and minimize illperformance of manufacturing operations during their immediate work shift.

When the dynamic performance measure displays are called by the user to the video display screen 21, the graphic data is put on the screen and an object manager residing in the workstation processor module 41 establishes connection with the blocks and historian data necessary to update plant data on the display. The block based data updates on the display whenever an object changes by more than the exception band specified for the display. The real time historical data updates at its base frequency, and the reduced historical data is static. The display continues to dynamically update as long as it is on the video display 21 screen so the operators can view the actual performance of the operation as the product is being produced (i.e. as manufacturing operations are being performed). To that end, the operators are enabled to make changes and determine if the changes have a positive or negative impact on the performance of the process means under consideration. For example, the operator may reduce the charge of catalyst in the resource cost example previously given, and find that energy in the catalyst necessarily has to increase actually increasing the overall cost of manufacturing operations. With the provided performance information available in a real-/time sense, the operators are able to truly improve performance in key areas of the manufacturing process (operations) as needed.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. In a processing plant having a plurality of processes performed by a plurality of process means in a certain pattern to provide manufacturing operations, control apparatus comprising:

a multiplicity of sensors coupled to a plurality of process means which provide manufacturing operations, each sensor providing signals indicative of current state of a respective process means;

a digital processor assembly coupled to the sensors for receiving the sensor signals;

a video display coupled to the digital processor assembly;

control means coupled to the plurality of process means; and computer means supported by the digital processor assembly for determining from the sensor signals a quantitative measurement of current performance of the manufacturing operations based on sensed current state of at least one process means, and for providing indications, displayable on the video display, of difference between the determined measurement of current performance of manufacturing operations with respect to the process means and a predetermined measurement of target performance of manufacturing operations, the computer means determining measurement of current performance of manufacturing operations (a) in terms of production cost when sensed current state of a process means includes sensed amount of resource used, and (b) in terms of yield when sensed current state of a process means includes sensed rate of operation, such that measurement of current performance is indicative of one of production factors and resource factors, the predetermined measurement of target performance being based on a same one of the production factors and resource factors such that (i) said difference between the determined measurement of current performance and the predetermined measurement of target performance is indicative of current overall quality of manufacturing operations in terms of said one of production factors and resource factors, and (ii) operator adjustment of said one of production factors and resource factors, through the control means of the process means in accordance with the indicated difference is enabled, said operator adjustment of the process means changing state of the process means to a state of operation which provides the target performance of manufacturing operations.

2. Apparatus as claimed in claim 1 wherein the plurality of process means includes pumps, storage vessels, transfer lines and valves.

3. Apparatus as claimed in claim 1 wherein the sensors include temperature sensors, volume sensors, weight sensors and pressure sensors.

4. Apparatus as claimed in claim 1 wherein the computer means determines current performance of the manufacturing operations in terms of at least one of down time, output product quality, and amount of production.

5. Apparatus as claimed in claim 1 wherein the computer means is coupled to an external system for receiving therefrom the predetermined measurment of target performance.

6. Apparatus as claimed in claim 1 wherein the control means are coupled to the digital processor assembly; and the apparatus further comprises a processor member supported by the digital processor assembly for receiving from the computer means working information including determined measurements of performance, predetermined target measurements, indications of sensed states of process means, operator adjustment with the control means, and predetermined thresholds for alarms, the processor member storing the working information in time order in a relational database for subsequent general access.

7. Apparatus as claimed in claim 1 wherein the digital processor assembly includes a plurality of processor modules, different sensors being coupled to different processor modules, and the processor modules each having an object manager for transmitting sensor signals from respective processor modules to the computer means upon request by the computer means.

8. Apparatus as claimed in claim 7 wherein the processor modules store respective sensor signals as blocks of data points in respective local memory areas, each block having a different name than other blocks and each object manager enables access of sensor signals by block name instead of memory location.

9. Apparatus as claimed in claim 1 further comprising an alarm coupled to the digital processor assembly, the computer means enabling the alarm when one of a determined measurment of performance and sensed state of a process means reaches a respective predefined threshold.

10. Apparatus as claimed in claim 9 wherein the computer means enables the alarm when a determined measurement of cost exceeds a predefined threshold.

11. Apparatus as claimed in claim 9 wherein the computer means enables the alarm when a determined measurement of quality falls outside a predefined range.

12. In a processing plant having a plurality of process means operated in a certain pattern to form manufacturing operations, a method of controlling performance of manufacturing operations comprising the steps of:

operating a plurality of process means in a certain pattern providing manufacturing operations;

sensing current state of process means;

providing indications of sensed current state of process means to a digital processor assembly;

in the digital processor assembly, (i) establishing quantitative measurements of performance of manufacturing operations from the indications of sensed current state of process means, when sensed current state of a process means includes sensed amount of resource used from a start time to a current time, said establishing quantitative measurements of performance including determining measurements of performance in terms of production cost, and when sensed current state of a process means includes sensed rate of operation, said establishing quantitative measurements of performance including determining measurements of performance in terms of yield, such that quantitative measurements of performance are indicative of one of production factors and resource factors, and (ii) comparing the established quantitative measurements to predetermined measurements of desired overall performance of manufacturing operations based on the same one of production factors and resource factors, said comparing forming quantitative differences between current state of process means and the predetermined measurements of desired overall performance of manufacturing operations in terms of said one of production factors and resource factors;

displaying on a video display coupled to the digital processor assembly, a series of screen views indicating formed quantitative differences between current states of process means and the predetermined measurements of desired performance of manufacturing operations provided by the process means, said formed quantitative differences being indicative of current overall quality of manufacturing operations in terms of said one of production factors and resource factors; and adjusting said one of production factors and resource factors by adjusting control means coupled to the process means in accordance with the quantitative difference indicated in the screen views such that states of process means approach operations thereof that provide the desired performance of manufacturing operations.

13. A method as claimed in claim 12 wherein the step of establishing quantitative measurements includes calculating at least one of down time, output product quality, cost, yield and production.

14. A method as claimed in claim 12 further comprising the step of recording in a globally accessible database, digital processor assembly data including established quantitative measurements, indications of process means, predetermined measurements, indications of control means adjustments, and predefined alarm thresholds, such that the digital processor assembly data is subsequently accessible by desired applications.

15. A method as claimed in claim 12 further comprising the step of sounding an alarm coupled to the digital processor assembly when established quantitative measurements exceed a predefined threshold.

16. A method as claimed in claim 15 wherein the established quantitative measurements include a cost measurement, and the alarm is sounded when the cost measurement exceeds a predefined threshold.

17. A method as claimed in claim 15 wherein the established quantitative measurements include a quality measurement, and the alarm is sounded when the physical quality measurement exceeds a predefined threshold.

18. In a processing plant having a plurality of process means operated in a certain pattern forming manufacturing operations, control apparatus comprising:

a multiplicity of sensors coupled to the process means, each sensor providing signals indicative of current state of a respective process means;

a network of computer workstations, each workstation having:

(a) a digital processor assembly coupled to the sensors of a certain group of process means for receiving the signals therefrom, digital processor assemblies of different workstations being coupled to sensors of different groups of process means to receive respective sensor signals;

(b) a video display coupled to the digital processor assembly;

(c) computer means coupled to the digital processor assembly for (i) providing from the received sensor signals quantitative measurements of current performance of manufacturing operations with respect to sensed current states of process means of the workstation, the computer means determining quantitative measurements of current performance of manufacturing operations (a) in terms of production cost when sensed current state of a process means includes sensed amount of resource used, and (b) in terms of yield when sensed current state of a process means includes sensed rate of operation, such that each quantitative measurement of current performance is indicative of one of production factors and resource factors, and for (ii) displaying on the video display indications of the quantitative measurements in a manner which is indicative of necessary adjustments of said ones of production factors and resource factors and of the process means of the workstation to provide a predetermined desired measurement of performance of manufacturing operations, said adjustments changing state of the process means of the workstation to a state of operation which provides the predetermined desired measurement of performance of manufacturing operations; and computer means of different workstations displaying on respective video displays indications of respective quantitative measurements in manners indicative of necessary adjustments of respective ones of production factors and resource factors and of process means to provide the same predetermined desired measurement of performance of manufacturing operations.

* * * * *